United States Patent [19]

Lacey

[11] Patent Number: 4,677,248

[45] Date of Patent: Jun. 30, 1987

[54] APPARATUS FOR MOUNTING SOLAR CELLS

[76] Inventor: Thomas G. Lacey, 3516 E. Clinton, Fresno, Calif. 93703

[21] Appl. No.: 776,149

[22] Filed: Sep. 13, 1985

[51] Int. Cl.$^4$ ............................................. H01L 25/02
[52] U.S. Cl. ....................................... 136/244; 52/27; 52/173 R; 126/417; 136/291; 248/237
[58] Field of Search ................... 136/244, 251, 291; 52/173 R, 27; 248/237; 126/417, 450

[56] References Cited

U.S. PATENT DOCUMENTS

| | | | |
|---|---|---|---|
| 3,255,047 | 6/1966 | Escoffery | 136/244 |
| 3,411,050 | 11/1968 | Middleton et al. | 136/245 |
| 3,459,391 | 8/1969 | Haynos | 244/1 R |
| 3,658,596 | 4/1972 | Osborne | 136/251 |
| 3,756,858 | 9/1973 | Dillard | 136/245 |
| 3,769,091 | 10/1973 | Leinkram et al. | 136/246 |
| 3,783,029 | 1/1974 | Dillard et al. | 136/245 |
| 4,040,867 | 8/1977 | Forestieri et al. | 136/244 |
| 4,043,834 | 8/1977 | Rusch | 136/245 |
| 4,101,101 | 7/1978 | Barkats et al. | 244/173 |
| 4,133,501 | 1/1979 | Pentlicki | 244/173 |
| 4,189,881 | 2/1980 | Hawley | 52/220 |
| 4,203,646 | 5/1980 | Desso et al. | 339/205 |
| 4,209,347 | 6/1980 | Klein | 136/246 |
| 4,233,085 | 11/1980 | Roderick et al. | 136/244 |
| 4,287,382 | 9/1981 | French | 136/244 |
| 4,321,416 | 3/1982 | Tennant | 136/244 |
| 4,371,139 | 2/1983 | Clark | 248/237 |
| 4,384,163 | 5/1983 | Rauschenbach et al. | 136/245 |
| 4,384,164 | 5/1983 | Richard | 136/245 |
| 4,392,009 | 7/1983 | Napoli | 136/251 |
| 4,394,529 | 7/1983 | Gounder | 136/245 |
| 4,426,813 | 1/1984 | Buzzi, Jr. | 52/27 |
| 4,491,681 | 1/1985 | Kirpich | 136/246 |

OTHER PUBLICATIONS

GSA Federal Office Supply Catalog Stock #9905-0-1-207-5553.
Publication entitled *Arco Solar News*, Autumn, 1982, vol. 2, No. 4.
Flyer of *Solarex Corporation* bearing the statement "We've Got a Direct PowerLine to the Sun for You".
Flyer of *Energy Conversion Devices, Inc.* bearing the statement "World Leader in Amorphous Solar Cell Technology".
Flyer of *3M Co.* entitled "Hard Surface Maintenance Products".

*Primary Examiner*—Aaron Weisstuch
*Attorney, Agent, or Firm*—Worrel & Worrel

[57] ABSTRACT

An apparatus for mounting solar cells and the like on a supporting structure, the apparatus having a panel composed of an open textured, electrically non-conductive, non-woven web adapted to receive a solar cell, a plurality of mounting assemblies, each composed of a first element adapted to be affixed on the supporting structure and a second element releasably engageable therewith adapted to be attached to the panel, the mounting assemblies attached to and arranged on the supporting structure in spaced relation to each other and retaining the panel and the solar cell borne thereby in spaced relation to the supporting structure to define an air passage therebetween, and a frame secured on the marginal edges of the panel and incorporating channels for housing the electrical cables of the solar cell.

11 Claims, 7 Drawing Figures

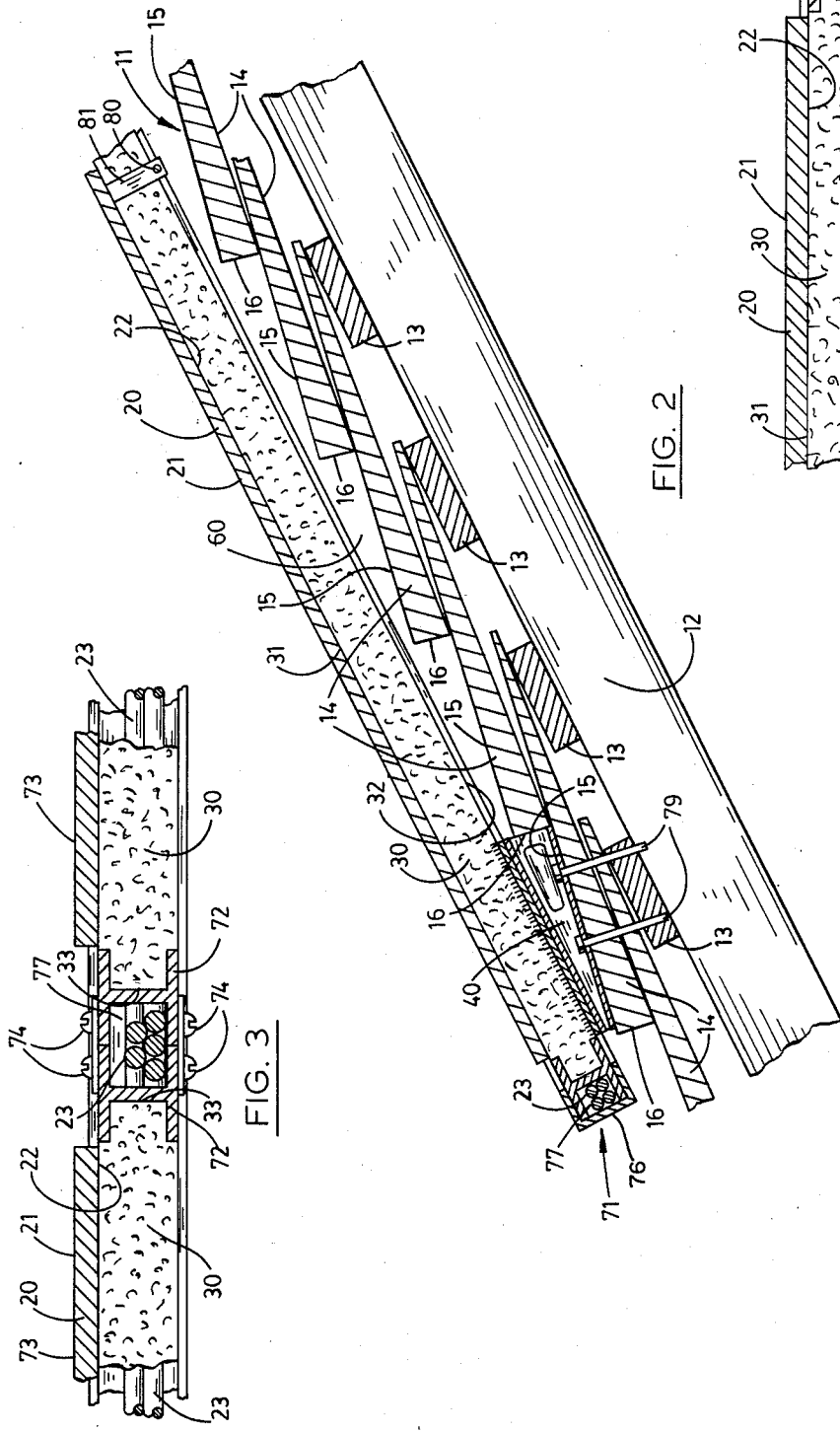
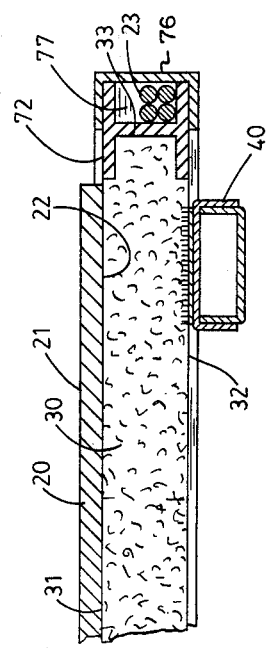

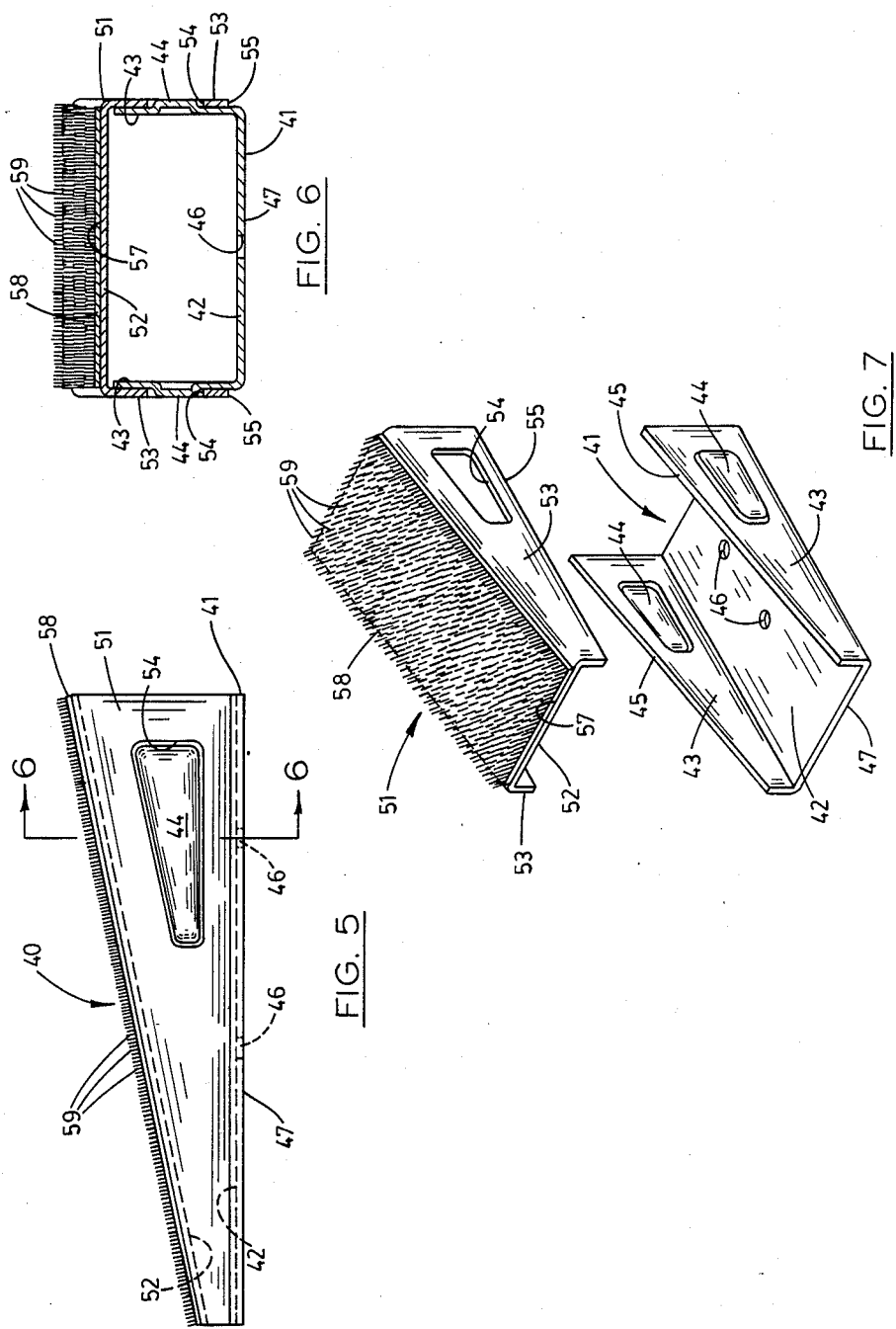

4,677,248

APPARATUS FOR MOUNTING SOLAR CELLS

BACKGROUND OF THE INVENTION

1. Field of the Invention

The present invention relates to an apparatus for mounting solar cells and the like on a supporting structure and more particularly to such an apparatus which is inexpensive to construct and maintain while affording the optimum conditions for operation and maintenance of the solar cell or like device in virtually any operative environment.

2. Description of the Prior Art

Photovoltaic solar cells were first manufactured commercially in the late 1950's. This technology, in the early 1960's, was used exclusively to power space satellites. The cost per watt, at that time, was well in excess of one thousand dollars. Intensified research and more efficient production techniques improved solar cell construction so that the price per watt fell dramatically throughout the 1960's. The 1973 Arab oil embargo provided the impetus for still more intensified research in the construction of solar cells. Currently, the price per watt is between five to eight dollars. It is generally agreed that when the price per watt falls to between $1.50 and $2.00, such solar cells will be competitive with readily available fossil fuels. As this trend continues, the usage of solar cells to power residential homes will become substantially more widespread.

Solar cells in an assembled operational configuration characteristically have an outer tempered glass covering, the photovoltaic cells with electrical connectors, a plastic or metal bottom plate, a metal perimeter frame attached to the tempered glass and bottom plate, and weatherproof electric interconnecting panel cables. Such an assembly is typically referred to as a "solar panel or module". Solar modules are typically mounted on heavy metal support racks that are anchored to the roof or other surface. This entire assembly is referred to as a "solar array". An analysis of the component costs of a typical solar array reveals that approximately only 50% of the total cost of the solar array is attributable to the photovoltaic cells themselves. Thus, approximately 50% of the cost of such a solar array is attributable to the tempered glass, bottom plate, electrical cables, and array mounting racks.

The prior art is replete with devices for mounting photovoltaic cells. Such prior art devices have been employed with varying degrees of success, but have suffered from numerous shortcomings. One of the major shortcomings, as already indicated, is the cost of the components that constitute the mounting assembly itself. This is attributable both to the types and quantities of materials which have been employed.

Another shortcoming of prior art mounting assemblies has been that the mounting assemblies provide for little or no air circulation about the solar panels supported thereby or the photovoltaic cells themselves and there is, consequently, inadequate heat dissipation. This substantially detracts from the operative efficiency of the photovoltaic cells since as the surface temperature of a photovoltaic cell increases, its efficiency correspondingly decreases.

Still another significant problem with prior art mounting assemblies is that they are not readily adaptable on site to the conditions found at the particular position desired for installation. Different forms of roof construction and irrregular surface areas make installation of such prior art mounting assemblies difficult and therefor expensive. This problem can be particularly acute in residential installations where only limited space is available.

Similarly, prior art mounting assemblies, once installed, are difficult to remove or disassemble for maintenance and the like.

Therefore, it has long been known that it would be desirable to have an apparatus for mounting solar cells and the like which is adaptable for installation in a wide variety of environments and can be adapted on site during such installation; which operates cooperatively with the solar cells borne thereby for more efficient use of the solar cells; which is readily removable for maintenance after installation; and which is of a relatively nominal price.

SUMMARY OF THE INVENTION

Therefore, it is an object of the present invention to provide an improved apparatus for mounting solar cells and the like.

Another object is to provide such an apparatus which allows the free circulation of air around the solar cells to decrease their temperatures and thus increase their operative efficiency.

Another object is to provide such an apparatus which is readily adaptable to virtually all environments in which solar cells can be employed and which is uniquely well suited to adaptation on site to the particular requirements of the individual site selected for such installation.

Another object is to provide such an apparatus which allows the apparatus to be released easily from the surface of the structure upon which it is mounted for purposes of maintenance, modification and the like.

Another object is to provide such an apparatus which is characterized by an ease of installation, a simplicity of construction, and which can be sold and installed at moderate expense.

Another object is to provide such an apparatus which is adaptable to conform to the particular type of roof on which it is to be mounted so that the apparatus offers all of the operative advantages while maintaining optimum structural integrity in cooperation with the roof.

Further objects and advantages are to provide improved elements and arrangements thereof in an apparatus for the purposes described which is dependable, economical, durable and fully effective in accomplishing its intended purposes.

These and other objectives are achieved in the apparatus for mounting solar cells and the like of the present invention wherein a porous, electrically non-conductive panel is adapted to receive solar cells thereon and is mounted in an installed condition by a plurality of mounting assemblies, individually composed of first and second releasably engageable elements, retaining the panel and the solar cells thereof in spaced relation to the supporting structure and having a substantially rigid frame for interconnecting a plurality of the panels to form an array of solar modules, the frame having channels arranged to house the electrical cables of the solar modules.

BRIEF DESCRIPTION OF THE DRAWINGS

FIG. 2 is a somewhat enlarged, fragmentary, vertical section taken on line 2—2 in FIG. 1.

FIG. 3 is a somewhat enlarged, fragmentary, vertical section taken on line 3—3 in FIG. 1.

FIG. 4 is a somewhat enlarged, fragmentary, vertical section taken on line 4—4 in FIG. 1.

FIG. 5 is a side elevation of a mounting assembly of the apparatus of the present invention.

FIG. 6 is a transverse vertical section taken on line 6—6 in FIG. 5.

FIG. 7 is a perspective view of the mounting assembly of FIG. 5 with the first and second elements thereof separated from each other for illustrative convenience.

DESCRIPTION OF THE PREFERRED EMBODIMENT

Figure 1:
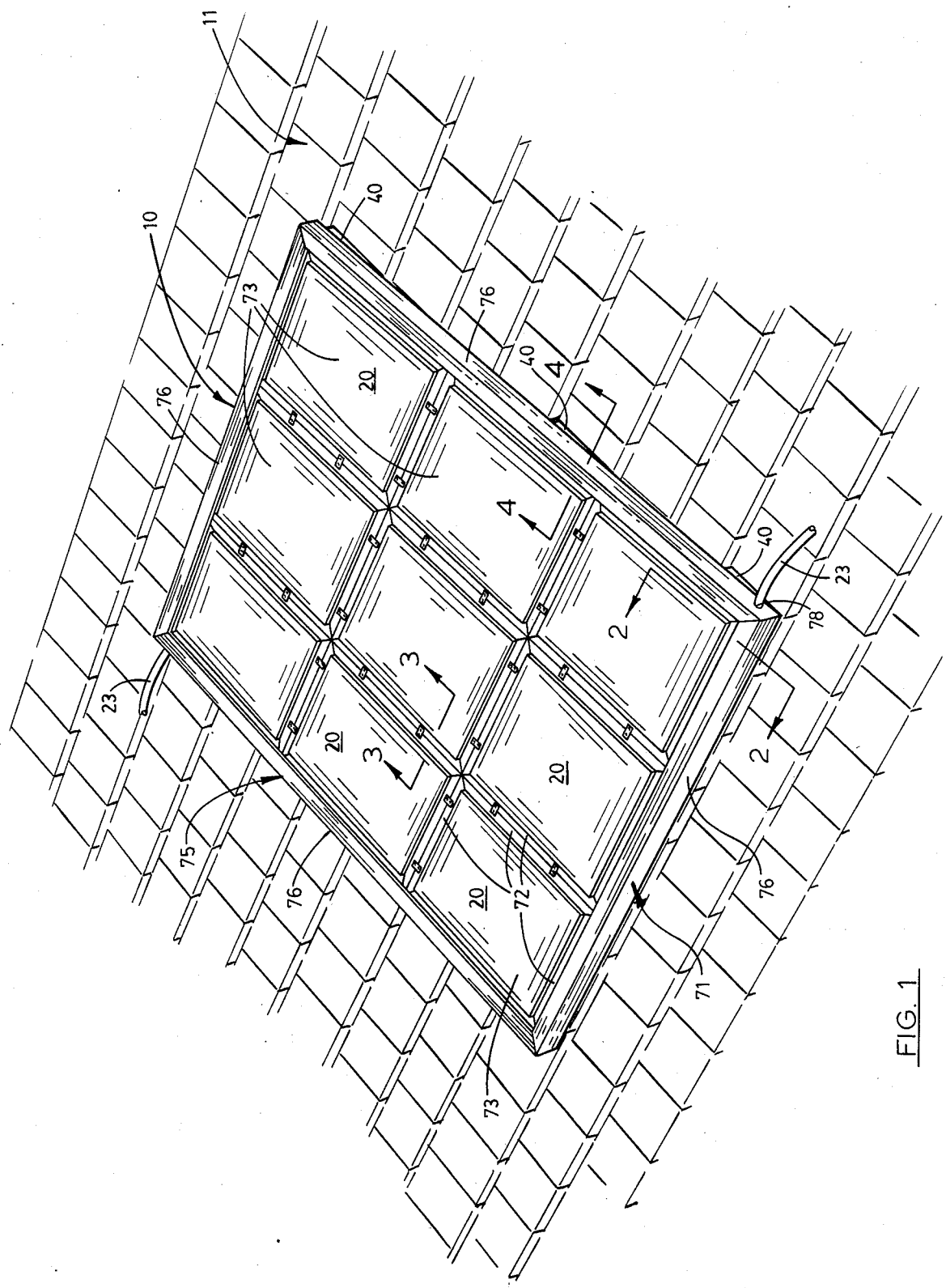
FIG. 1 is a perspective view of the apparatus for mounting solar cells and the like of the present invention and shown in a typical operative environment on the roof of a structure.

Referring more particularly to the drawings, the apparatus for mounting solar cells and the like embodying the principles of the present invention is generally indicated by the numeral 10 in FIG. 1.

As shown in FIGS. 1 and 2 for illustrative convenience, the apparatus 10 is mounted on a roof 11 of a structure such as a house or the like. The roof, as can best be seen in FIG. 2, is of a conventional construction having a plurality of rafters 12 interconnected by a plurality of slats 13 extending in spaced, substantially parallel relation normal to the rafters thereby forming a supporting surface for the roof. The roof itself is composed of a plurality of overlapping wood shingles or shakes 14 secured to each other and on to the slats. Each of the shakes 14 has an upper surface 15 and a front surface 16.

The apparatus 10 is adapted to receive and to mount, as will hereinafter be described, a photovoltaic solar cell 20 which has a front display surface 21 and, correspondingly, a back mounting surface 22. The photovoltaic solar cell can be of either the amorphous or the nonamorphous type. As used herein, "photovoltaic solar cell" is used to indicate a structure in fact containing one or more photovoltaic solar cells forming a sealed entity. The photovoltaic solar cell operates in a manner familiar to those skilled in the art. The photovoltaic solar cell has cables 23 for conducting electrical energy produced by the photovoltaic solar cell.

The back mounting surface 22 of the photovoltaic solar cell 20, in an installed condition, is affixed in substantially facing engagement on a substantially flat panel 30 constituting part of the apparatus 10. In the embodiment shown in the drawings, nine solar cells are individually mounted in like manner on nine such panels 30. For convenience, a single such panel will be described. The panel is constructed of a flexible, porous, open textured, electrically non-conductive material.

The preferred material of which the panel is constructed is a polyester fiber, open textured non-woven web marketed by the 3M Company under the mark "Scotch-Brite Brand 51".

The panel 30 has a substantially flat upper surface 31 which is adapted to receive in fixed relation thereon the photovoltaic solar cell, as best shown in FIG. 2. Any suitable method for attachment can be employed including use of a suitable adhesive. The photovoltaic solar cell is affixed on the upper surface of the panel by any such fastening means in substantially facing engagement so as in use to leave the display surface of the photovoltaic solar cell exposed to radiant energy from the sun. The panel has a lower surface 32 and is rectangular having four marginal edges 33. While, as shown and described herein, a single solar cell is mounted on each panel 30, if desired more than one solar cell can be mounted on a panel. The panel 30, while of a rectangular configuration as shown herein, can be initially constructed or cut on site, to virtually any desired shape to best conform to the area in which it is to be installed.

The apparatus 10 has a plenary number of mounting shoes or assemblies 40 which are adapted to mount and secure the panel 30 on a supporting structure such as the roof 11. The mounting assembly is best shown in FIGS. 5, 6, and 7. The mounting assembly has a first element 41 adapted to be attached to the upper surface 15 of one of the shakes 14. The first element is substantially U-shaped in cross section with a flat central portion 42 and spaced, substantially parallel side walls 43 disposed in substantially right-angular relation to the central portion. Each of the side walls 43 has a laterally extending projection 44 and a sloping upper edge 45. The central portion 42 has a pair of nail or screw holes 46 extending therethrough and a first surface 47. The first surface 47 in the embodiment shown in FIGS. 5, 6, and 7 is flat. However, the first surface 47 can be manufactured in a variety of different shapes to conform to the supporting surface upon which it is to be affixed. Thus, for example the first surface can be manufactured to form a concave configuration to conform to a tile roof, or can be formed in a corrugated configuration to conform to a corrugated roof.

Each mounting assembly has a second element 51 which is releasably engageable with the first element 41. The second element is substantially U-shaped in cross section and has a substantially flat central portion 52 and spaced, substantially parallel side walls 53 disposed in substantially right angular relation to the central portion. Each of the side walls 53 has an opening 54 therein dimensioned to be snap-fitted about the projection 44 of the corresponding side wall 43 of the first element in mating relation, as best shown in FIGS. 5 and 6. Each of the side walls 53 has a sloped lower edge 55. The side walls 53 of the second element are spaced from each other sufficiently to allow the side walls slidably to pass outwardly of and over their corresponding side walls 43 of the first element until the projections individually snap fit into their respective openings in a releasably interlocking configuration as shown in FIGS. 5 and 6. As an alternative to the projections and openings, the first and second elements can be releasably interlocked in an alternative embodiment by having a pin extended through appropriate holes in the side walls 43 and 53.

The central portion 52 of the second element has a second surface 57 on which is adhesively mounted a panel 58 having a multiplicity of bristles 59 extending upwardly therefrom. The bristles, are adapted, upon pressing of the panel 30 thereagainst to penetrate the material of the panel, to retain it, and the second upper surface in close registry.

The projections 44 of the first element 41 and the openings 54 of the second element 51 constitute a snaplock mechanism, which is operable for releasably interlocking the first and second elements. It should be apparent that when placed in the interlocked configuration of FIGS. 5 and 6, the first element and second element are selectively releasable one from another by disengaging this snap-lock mechanism. When the first and second elements of the mounting assemblies are releasably engaged, the mounting assemblies attain a height sufficient to retain the panel in spaced relation to the roof 11, as will hereinafter be described in greater detail.

As previously noted, the embodiment of the mounting assembly shown and described herein is specifically adapted for installation on shake or shingle roofs. The first and second elements can be constructed so that the height and angle of the second surface relative to the first surface is such as to conform to the particular size and angle of the shakes or shingles employed on the roof on which the mounting assemblies are to be installed. It has already been noted that the first elements can be constructed so that the first surfaces thereof conform to other types of roofs such as tile and corrugated roofs. Similarly, the first and second elements can be constructed so that the mounting assemblies have a flat, rather than a wedge shaped configuration, with the first and second surfaces being substantially parallel to each other. Such mounting asemblies are adapted for use on a flat surfaced roof.

The mounting assemblies 40 are adapted to be mounted on the supporting structure within the area to be covered by the panel 30, and in a preselected pattern relative to each other for supporting the panel in spaced relationship thereto thus forming an air space 60 between the lower surface 32 of the panel and the roof 11, as can best be seen in FIG. 2.

The apparatus 10 has a substantially rigid frame 71, best shown in FIG. 1. The rigid frame is constructed of "H" or "I" shaped frame members 72, preferably of plastic or metal, having lengths matching the marginal edge 33 of the panel 30 on which it is to be installed and preferably having ends mitered at angles of 45 degrees. A frame member is secured on each of the four marginal edges of the panel 30 by adhesive, or other suitable fastening means in fitted relation, as best shown in FIGS. 2, 3, and 4. Thus, the panel is bounded on all four sides by the frame members which assist in retaining the panel in a flat configuration.

The panel 30 mounting a solar cell 20 and bounded by the frame members 72 constitutes a solar module 73. A plurality of such solar modules can be interconnected, using screws 74 and bracket plates or other suitable fastening means, in a common plane to form a solar array 75. As depicted in FIG. 1, nine such solar modules are so interconnected to form a rectangular solar array. Four channel members or boundary caps 76 are preferably adhesively secured on the edges of the solar array so formed as can best be seen in FIGS. 2 and 4. The ends of the boundary caps are preferably mitered at angles of 45 degrees so as smoothly to interfit, as shown in FIG. 1. When assembled in the solar array 75, juxtaposed frame members 72, as shown in FIG. 3, and, juxtaposed frame members 72 and boundary caps 76, as shown in FIGS. 2 and 4, form channels 77 extending between adjacent solar modules and about the periphery of the solar array respectively. The channels are available for the extension of the electrical cables 23 of the solar cells 20 therethrough as may be required to interconnect the solar cells within the solar array or for the extension of a main collector electrical conductor from the array. Either as manufactured or as modified on site, or both, holes 78 can be drilled through the frame members 72 and boundary caps 76 to gain access to the channels for the extension of the electrical cables therethrough. As shown in FIG. 1, a pair of main electrical connectors 23 are extended through holes 78 in such boundary caps.

The frame members 72 and the boundary caps 76 protect the electrical cables from the effects of the environment, which would otherwise act on the electrical cables.

In certain instances it has been found desirable further to secure the panel 30 of each solar module 73. This may be desirable where wind conditions so indicate or where the relatively great size or the panel is such as to warrant it. However, it may be done in every installation if desired. Further securing of the panel of each solar module is accomplished by fastening, by any suitable means, a wire or cable 80 on and extending between opposite parallel frame members 72 so that the cable extends immediately beneath the panel and the lower surface 32 of the panel is rested on the cable. A clip or wire fastener 81 is then extended through the upper surface 31 of the panel, downwardly through the lower surface of the panel and attached to the cable. This is done before the photovoltaic cell 20 is mounted on the upper surface of the panel. One or more so attached cables and fasteners can be employed further to secure the panel in position. The cable resists sagging by the panel and the cable and fastener prevent outward bulging of the panel. For illustrative convenience, a cable and fastener are shown in FIG. 2.

OPERATION

The operation of the described embodiment of the present invention is believed readily apparent and is briefly summarized at this point.

The apparatus 10 for mounting solar cells and the like of the present invention is shown in FIG. 1 in a fully assembled and installed condition wherein nine such apparatuses individually mount solar cells 20 forming discrete solar modules 73 interconnected to form a solar array 75 mounted on the roof 11. The apparatus can be preassembled for installation as a unit as shown. In such a configuration, installation on the roof 11 requires only that a plurality of the mounting assemblies 40 be secured on the roof in predetermined positions and numbers securely to retain the solar array so formed in fixed position. The mounting assemblies are individually mounted in position by first releasing the second element 51 from the snap fit engagement with the first element 41 by pressing in on the projections 44 to release the projections from the openings 54 permitting the second element to be slipped from the first element. Of course, the first and second elements can be available already separated from each other. The first element is then positioned in its predetermined position, as for example, shown in FIG. 2, rested on the upper surface 15 of a shake 14 with the larger rear portion thereof abutting the front surface 16 of the adjoining rearward shake. Nails or screws 79 are then individually driven througn the holes 46 and preferably into the slats 13 therebeneath securely to retain the first element in the selected position.

Subsequently, the second element 51 is snap fitted over the first element 41 so that the projections 44 are received in the openings 54 and the mounting assembly 40 assumes the configuration shown in FIGS. 5 and 6. The number and positions for the mounting assemblies can be determined according to the needs of the particular arrangement to be installed. However, preferably for a solar array 75 of the size shown in FIG. 1, there would be one mounting assembly for each of the panels 30, or, in other words, one mounting assembly for each individual solar module or the nine solar modules forming the solar array.

Once all of the mounting assemblies 40 have been so mounted on the roof 11, a suitable adhesive is applied to cover the panel 58 which is mounted on the second surface 57 of each mounting assembly and on the bristles 59 thereof. Thereafter, the solar array 75 is lowered into position over the mounting assemblies and the lower surfaces 32 of the panels 30 pressed downwardly into engagement with their respective mounting assemblies so that the bristles penetrate the panels 30 and allow the lower surfaces of the panels to contact the adhesive in facing engagement with the panels 58. The bristles operate to retain the solar array in fixed position as the adhesive sets as well as forming a permanent and strong interlocking bond between the panels 30 and their respective second elements 51. The joints between juxtaposed frame members 72 can be sealed using a suitable silicone sealant to waterproof the channels 77 through which the cables 23 are extended.

So installed, the electrical cables 23 shown in FIG. 1 are simply connected to the electrical system which the solar array 75 is intended to supply and the array is made operable.

While the above described procedures have advantage in certain applications where a preassembled solar array 75 is simply installed in that preassembled configuration on a roof 11, in many other situations, the apparatus has much greater benefit where it is assembled at the site or is assembled elsewhere to suit precisely a particular site.

Thus, the apparatus of the subject invention is designed to be site adaptable. That is to say, a desired solar array shape will be selected whereby the apparatus conforms to the surface and surface features of the structure upon which it is to be mounted. The individual solar modules 73 are individually assembled in the desired array by fastening the frame members 72 together by use of screws 74. The electrical cables 23, which conduct electrical energy produced by the solar cells, are deployed in the channels 77 formed by the frame members 72 which defines the periphery of solar modules. The mounting assemblies 40 are adapted to be mounted on the upper surface of the roof 15 within the area to be covered by the solar array 75 so formed and in a preselected pattern relative to each other for supporting the solar array 75. As previously noted, of course the first surface 47 can be manufactured to fit a corrugated metal roof, a tile roof, a cedar shake roof, a flat roof or any other type of roof.

As already noted in relation to the procedures for mounting a premanufactured solar array, the mounting assemblies 40, once properly affixed to the roof, have applied to the second upper surface 57 thereof, an adhesive. The bristles are adapted, upon pressing of their respective panel 30 thereagainst, to penetrate the material of the panel, to retain the panel and the upper second surface in registry to permit the adhesive which is interposed between the panel and the mounting assembly to set.

Still another procedure for employing the apparatus 10 to mount solar cells has great application particularly on small surface areas and where there are surface features, such as air vents, chimneys, antennas and the like about which the solar array 75, once constructed and installed, must extend and cannot cover. Using this procedure, the solar array 75 can in fact be assembled on the surface or roof 11 by individually assembling and mounting each solar module 73 on the roof using the mounting assemblies 40 before interconnecting the modules using the screws 74. This permits, for example, the modules to be assembled in a form such that an opening is left in the solar array, as for example leaving out one of the solar modules, through which the surface feature such as an air vent can extend. Where there is such an opening, the boundary caps 76 are installed on the adjoining frame members 72, as previously described, to form a perimeter for the opening and to enclose any electrical cables 23 extending therealong.

Still further, in this regard the panels 30, being formed of the polyester material heretofore identified, can be cut not only to any rectangular size desired but also to any shape desired. Thus, assembling the solar modules as already described, the resulting solar modules and solar array can be formed in literally any shape desired for the particular area of installation. While it is anticipated that these configurations would normally be angular so that straight frame members 72 and boundary caps 76 can be employed, of course, special curved frame members and boundry caps can be manufactured to fit curved configurations.

The mounting assemblies 40 which retain the panels 30 of the solar array 75 in spaced relation to the roof 11 define an air space 60 between the lower surfaces 32 of the panels and the upper surface of the roof.

The second elements 51 are selectively releasable, as previously noted, from their respective first elements 41 for removal of the solar array 75, or any solar module 73 thereof, from the roof. This feature thus facilitates the easy removal of individual solar modules which may from time to time require maintenance or replacement, without necessitating the removal of the entire array, or if necessary, the entire solar array from the supporting surface.

The apparatus 10 permits air to flow about and in close proximity to the solar cells by passage through the space 60 and through the panels 30 between the fibers of the open textured, non-woven web which comprises the flexible panel 30. The back mounting surfaces of the solar cells, being in direct facing engagement with the upper surfaces 31 of the panels, are in a heat transferring relation thereto. The movement of air through the panels and the air space, particularly since the lower surfaces 32 of the panels are in direct communication therewith, as shown in FIG. 2, facilitates the dissipation of heat from the photovoltaic solar cells. The lowering of the temperature of the solar cells conversely increases the efficiency of operation of the solar cells.

Therefore, the apparatus for mounting solar cells and the like of the present invention is adaptable for installation in a wide variety of environments and can be adapted on site during such installation; operates cooperatively with the solar cells borne thereby for more efficient use of the solar cells; is readily removable for maintenance after installation; and can be constructed and installed at a nominal price when compared with prior art apparatus for mounting solar cells.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An apparatus for mounting solar cells on a supporting structure, the apparatus comprising a porous, electrically non-conductive panel constructed of a polyester fiber, open textured, non-woven web having a substantially flat upper surface adapted to receive in fixed relation thereon a solar cell and an opposite lower surface; and means engageable with said lower surface of the panel for mounting the panel on the supporting structure.

2. An apparatus for mounting solar cells on a supporting structure, the apparatus comprising a porous electrically non-conductive panel constructed of a polyester fiber, open textured, non-woven web, having a substantially flat upper surface adapted to receive in fixed relation thereon at least one solar cell, and an opposite lower surface; and an assembly composed of a first element adapted to be attached on said supporting structure within the area to be covered by said panel and a second element releasably engageable with the first element and having an upper surface bearing projections deployed to penetrate said lower surface of said panel in interlocking relation therewith.

3. An apparatus for mounting at least one solar cell on a supporting structure, said solar cell having predetermined opposite mounting and display surfaces, the apparatus comprising:
a panel composed of a polyester fiber, open textured, non-woven web adapted to receive the mounting surface of said at least one solar cell thereof affixed in substantially facing engagement, thereby leaving the display surface thereof exposed;
a plurality of mounting assemblies for supporting the panel, each having a first surface adapted to be mounted on the supporting structure and an opposite second surface, said mounting assemblies adapted to be mounted on the support structure within the area to be covered by the panel and in a preselected pattern relative to each other; and
adhesive interposed between the panel and the second surfaces of the mounting assemblies for securing the panel on the mounting assemblies.

4. The apparatus of claim 3 wherein each of said mounting assemblies is composed of a first element adapted to be mounted on said supporting structure; a second element having said second surface of the mounting assembly disposed in outwardly facing relation and including a plurality of material-engaging bristles extending outwardly from said second surface; and means for releasably interlocking the first and second elements of each mounting assembly so that when the first element thereof is mounted on said supporting structure, the second element is selectively releasable therefrom for removal of the panel and said at least one solar cell borne thereby.

5. The apparatus of claim 4 wherein said first element has said first surface of the mounting assemblies and said first surface is shaped to conform to said supporting structure.

6. The apparatus of claim 3 wherein each of said mounting assemblies has a height sufficient to retain the panel in spaced relation to said supporting structure to define an air space between the panel and said supporting structure.

7. The apparatus of claim 3 in which the said at least one solar cell adapted to be mounted on said apparatus includes at least one electrical cable for conducting electrical energy produced by the solar cell and wherein the apparatus has a substantially rigid frame secured on the panel bounding the periphery thereof and defining a channel for the extension of said electrical cable therethrough from the solar cell.

8. The apparatus of claim 7 wherein the frame is composed of I-shaped frame members adhesively mounted on the marginal edges of the panel.

9. The apparatus of claim 7 wherein the apparatus has a plurality of said panels, each adapted to mount at least one a solar cell, bounded by a frame defining said channel and adapted to be mounted on the supporting surface by a plurality of the mounting assemblies thereby forming discrete solar modules and wherein the frames of the solar modules are interconnected by fastening means to form an array of said solar modules.

10. The apparatus of claim 7 wherein a cable is mounted on the frame extending beneath the panel in supporting relation thereto and a fastener is extended through the panel and secured on the cable to fasten the panel on the cable.

11. An apparatus for mounting at least one solar cell on a supporting structure, said at least one solar cell having predetermined opposite mounting and display surfaces, the apparatus comprising:
a panel composed of a polyester fiber, open textured, non-woven web adapted to receive said mounting surface of said at least one solar cell thereon affixed in substantially facing engagement thereby leaving the display surface thereof exposed; and
a plurality of mounting assemblies each having a first surface adapted to be mounted on the supporting structure and an opposite second surface, said mounting assemblies adapted to be mounted on the supporting structure within the area to be covered by the panel and in a preselected pattern relative to each other for supporting the panel and with adhesive interposed between the panel and the second surfaces of the mounting assemblies, said mounting assemblies further having a plurality of projections borne by the second surfaces of the mounting assemblies and adpated upon pressing the panel thereagainst to penetrate the material of said panel to retain the panel and said second surfaces in registry for setting of the adhesive.

* * * * *